(12) United States Patent
Abdulrazzaq et al.

(10) Patent No.: US 11,959,013 B2
(45) Date of Patent: Apr. 16, 2024

(54) VISCOELASTIC SURFACTANT-BASED TREATMENT FLUIDS FOR USE WITH METAL OXIDE-BASED CEMENTS

(71) Applicant: Halliburton Energy Services, Inc., Houston, TX (US)

(72) Inventors: Waseem Abdulrazzaq, Al-Aqrabia (SA); Ayoub Ibrahim Awaji, Dhahran (SA); Siham Kamal Fatani, Dammam (SA); Jay Paul Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 34 days.

(21) Appl. No.: 17/378,331

(22) Filed: Jul. 16, 2021

(65) Prior Publication Data
US 2023/0019738 A1 Jan. 19, 2023

(51) Int. Cl.
| | | |
|---|---|---|
| *C09K 8/467* | (2006.01) | |
| *C04B 22/12* | (2006.01) | |
| *C04B 22/14* | (2006.01) | |
| *C04B 24/12* | (2006.01) | |
| *C04B 24/16* | (2006.01) | |
| *C04B 28/10* | (2006.01) | |
| *C04B 103/22* | (2006.01) | |

(Continued)

(52) U.S. Cl.
CPC ............ *C09K 8/467* (2013.01); *C04B 22/124* (2013.01); *C04B 22/142* (2013.01); *C04B 24/123* (2013.01); *C04B 24/16* (2013.01); *C04B 28/105* (2013.01); *E21B 33/13* (2013.01); *C04B 2103/22* (2013.01); *C04B 2103/40* (2013.01); *C09K 2208/30* (2013.01)

(58) Field of Classification Search
CPC .. C09K 8/467; C09K 2208/30; C04B 22/124; C04B 22/142; C04B 24/123; C04B 24/16; C04B 28/105; C04B 2103/22; C04B 2103/40; E21B 33/13
See application file for complete search history.

(56) References Cited

U.S. PATENT DOCUMENTS

| | | |
|---|---|---|
| 7,207,388 B2 | 4/2007 | Samuel et al. |
| 9,353,306 B2 | 5/2016 | Svoboda et al. |

(Continued)

FOREIGN PATENT DOCUMENTS

| | | |
|---|---|---|
| AU | 2002365886 A1 | 6/2003 |
| WO | 2020117268 A1 | 6/2020 |

OTHER PUBLICATIONS

Jiang, Guancheng et al., "Magnesium oxysulfate cement as a fast curing agent in drilling fluids to solve the severe loss", Petroleum Science and Technology, (Feb. 27, 2021), vol. 39, Nos. 7-8, pp. 216-234 (Year: 2021).*

(Continued)

*Primary Examiner* — Crystal J. Lee
(74) *Attorney, Agent, or Firm* — Conley Rose, P.C.; Rodney B. Carroll

(57) ABSTRACT

In one embodiment, the methods include introducing a treatment fluid including an aqueous base fluid, at least one viscoelastic surfactant, a divalent salt, a metal salt; and a metal oxide into a wellbore penetrating at least a portion of a subterranean formation; and allowing the treatment fluid to at least partially set in the subterranean formation.

17 Claims, 5 Drawing Sheets

(51) Int. Cl.
*C04B 103/40* (2006.01)
*E21B 33/13* (2006.01)

(56) References Cited

U.S. PATENT DOCUMENTS

| | | | |
|---|---|---|---|
| 10,138,165 | B2 | 11/2018 | Sarmah et al. |
| 2003/0166471 | A1 | 9/2003 | Samuel et al. |
| 2011/0083902 | A1 | 4/2011 | Huang et al. |
| 2016/0298028 | A1 | 10/2016 | Singh et al. |
| 2016/0355723 | A1* | 12/2016 | Yadav .................. E21B 33/138 |
| 2019/0055445 | A1 | 2/2019 | Kulkarni et al. |
| 2019/0316022 | A1 | 10/2019 | Reddy |
| 2019/0367800 | A1 | 12/2019 | Oliveira et al. |

OTHER PUBLICATIONS

Cui, Kai-Xiao et al., "Preparation and properties of magnesium oxysulfate cement and its application as lost circulation material", Petroleum Science, (Aug. 20, 2021), vol. 18, pp. 1492-1506. (Year: 2021).*

Foreign Communication from Related Application—International Search Report and Written Opinion of the International Searching Authority, International Application No. PCT/US2021/042983, dated Jul. 16, 2021, 10 pages.

Foreign Communication from Related Application—International Search Report and Written Opinion of the International Searching Authority, International Application No. PCT/US2021/042967, dated Jul. 23, 2021, 10 pages.

Guancheng, Jiang et al., "Magnesium oxysulfate cement as a fast curing agent in drilling fluids to solve the severe oss," Petroleum Science and Technology, Feb. 27, 2021, vol. 39, No. 7-8, pp. 216-234, Taylor & Francis Group.

Filing Receipt, Specification and Drawings for U.S. Appl. No. 17/378,234, filed Jul. 16, 2021, entitled "Viscoelastic Surfactant-Based Treatment Fluids for Use with Lost Circulation Materials," 44 pages.

Electronic Acknowledgment Receipt, Specification and Drawings for International Application No. PCT/US2021/42967, entitled "Viscoelastic Surfactant-Based Treatment Fluids for Use with Lost Circulation Materials," filed Jul. 23, 2021, 41 pages.

Electronic Acknowledgment Receipt, Specification and Drawings for International Application No. PCT/US2021/42983, entitled "Viscoelastic Surfactant-Based Treatment Fluids for Use with Metal Oxide-Based Cements," filed Jul. 23, 2021, 39 pages.

Savari, Sharath, Jacques Butcher, and Mustafa Al-Hulail. "Managing Lost Circulation in Highly Fractured, Vugular Formations: Engineered Usage of High Fluid Loss Squeeze and Reticulated Foam Lost Circulation Materials." IADC/SPE International Drilling Conference and Exhibition. OnePetro, 2020.

Dupriest, Fred E., et al. "Method to eliminate lost returns and build integrity continuously with high-filtration-rate fluid." IADC/SPE drilling conference. OnePetro, 2008.

Savari, Sharath, et al. "Reticulated Foam Enhanced High Fluid Loss Squeeze LCM for Severe Lost Circulation Management in Highly Fractured Formations." SPE Deepwater Drilling and Completions Conference. OnePetro, 2016.

* cited by examiner

VISCOELASTIC SURFACTANT-BASED TREATMENT FLUIDS FOR USE WITH METAL OXIDE-BASED CEMENTS

CROSS-REFERENCE TO RELATED APPLICATIONS

The present application is related to co-pending U.S. application Ser. No. 17/378,234 filed on Jul. 16, 2021, entitled "Viscoelastic Surfactant-Based Treatment Fluids For Use With Lost Circulation Materials," which is filed concurrently herewith, the entire disclosure of which is incorporated herein by reference.

BACKGROUND

The present disclosure relates to cement compositions and methods for using the same in subterranean formations. Treatment fluids are used in a variety of operations that may be performed in subterranean formations. As referred to herein, the term "treatment fluid" will be understood to mean any fluid that may be used in a subterranean application in conjunction with a desired function and/or for a desired purpose. The term "treatment fluid" does not imply any particular action by the fluid. Treatment fluids often are used in, e.g., well drilling, completion, and stimulation operations. Examples of such treatment fluids include, inter alia, drilling fluids, well cleanup fluids, workover fluids, conformance fluids, cementing fluids, gravel pack fluids, acidizing fluids, fracturing fluids, spacer fluids, and the like.

Treatment fluids used in servicing a wellbore may be lost to the subterranean formation while circulating the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. As a result, the service provided by such fluid may be more difficult to achieve. For example, a drilling fluid may be lost to the formation, resulting in the circulation of the fluid in the wellbore being too low to allow for further drilling of the wellbore. Also, a secondary cement/sealant composition may be lost to the formation as it is being placed in the wellbore, thereby rendering the secondary operation ineffective in maintaining isolation of the formation.

Treatment techniques may be employed to address fluid loss that occurs during drilling or other downhole operations such as plugging or bridging loss zones. Lost circulation treatments involving various plugging materials such as walnut hulls, mica and cellophane have been used to prevent or lessen the loss of fluids from wellbores. However, such treatments include the potential for damage to subterranean formations as a result of the inability to remove the plugging materials therefrom, and the dislodgement of the plugging materials from highly permeable zones whereby fluid losses subsequently resume. One technique for preventing lost circulation problems has been to temporarily plug voids or permeable zones with Sorel cement compositions.

Sorel cement is a non-hydraulic cement that typically includes a mixture of a metal oxide such as magnesium oxide (burnt magnesia) with a salt such as magnesium chloride. Sorel cements often may be removed with minimal damage to subterranean zones or formations by dissolution in acids. Sorel cement generally includes $MgCl_2$ or $MgCl_2.6H_2O$. However, there are variants that can be made with phosphates or sulfates. The $MgCl_2$ chemistry has been applied in the petroleum industry for applications to control water injection into zones that are not the targets of the injection prevention and, more recently, for lost circulation mitigation.

To provide the desired viscosity, polymeric and/or clay viscosifiers are commonly added to the treatment fluids including lost circulation materials. Examples of commonly used polymeric and/or clay viscosifiers include, but are not limited to, guar gums and derivatives thereof, xanthan gums and derivatives thereof, cellulose derivatives, biopolymers, organophilic clay and the like. The use of polymeric and/or clay viscosifiers, however, sometimes may be problematic. For instance, these viscosifiers may leave an undesirable residue in the subterranean formation after use which may require potentially costly remedial operations to clean up the fracture face and proppant pack. Foamed treatment fluids and emulsion-based treatment fluids have been employed to minimize residual damage, but increased expense and complexity may result from their use.

BRIEF DESCRIPTION OF THE FIGURES

These figures illustrate certain aspects of some of the embodiments of the present disclosure and should not be used to limit or define the claims.

Figure 1:
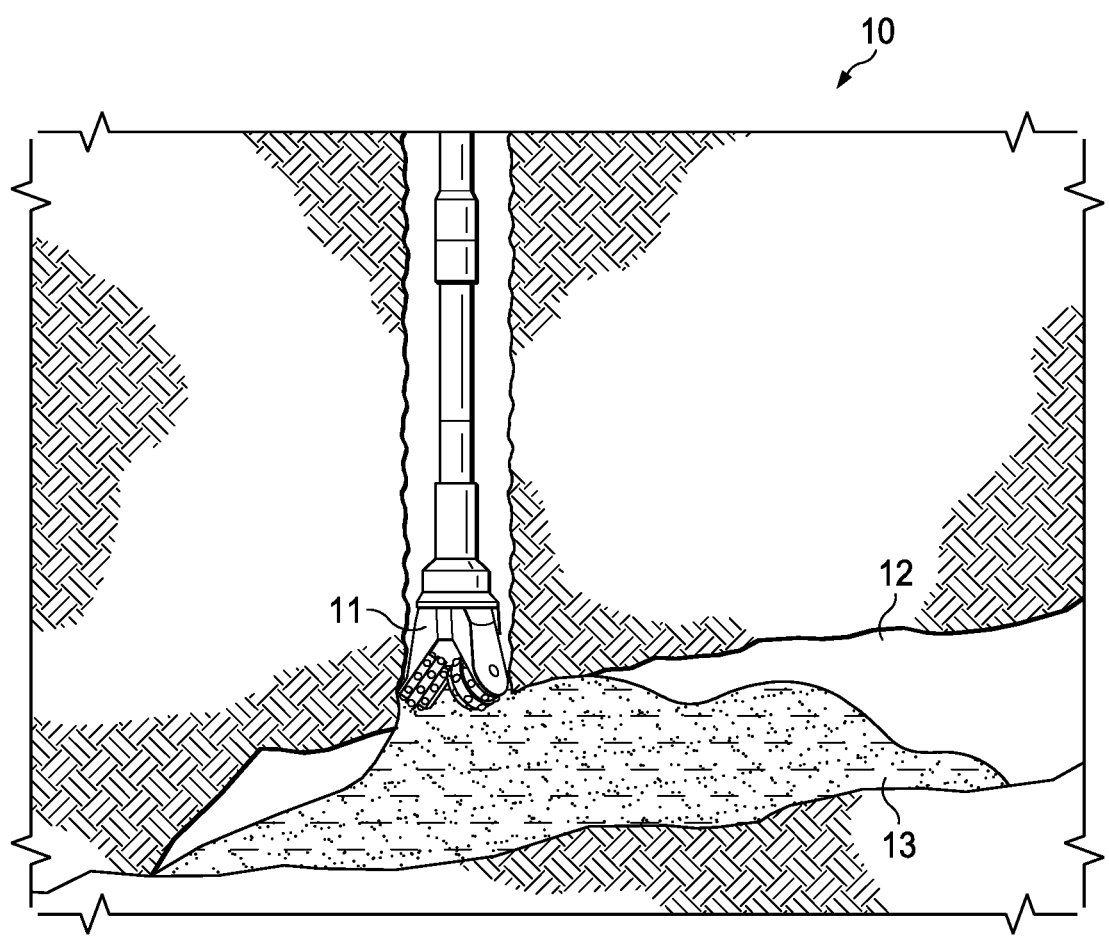
FIG. 1 is a schematic diagram of subterranean formation in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

As used herein, "loss zone" refers to a portion of a subterranean formation into which fluids circulating in a wellbore may be lost. In certain embodiments, loss zones may include voids, vugular zones, wash-outs, lost circulation zones, perforations, natural fractures, induced fractures, and any combination thereof.

As used herein, the term "set" refers to the process of becoming hard or solid by curing. As used herein, references to particle sizes of a particular mesh "or larger" and grammatical equivalents thereof refers to particles of that particular mesh size and particles larger than that size. Similarly, as used herein, references to sizes of a particular mesh "or smaller" and grammatical equivalents thereof refers to particles of that particular mesh size and particles smaller than that size.

As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

The present disclosure relates to cement compositions and methods for using the same in subterranean formations. More specifically, the present disclosure provides methods including: introducing a treatment fluid comprising an aqueous base fluid, at least one viscoelastic surfactant, a divalent salt, a metal salt, and a metal oxide into a wellbore penetrating at least a portion of a subterranean formation; and allowing the treatment fluid to at least partially set in the subterranean formation. In some embodiments, the present disclosure provides a treatment fluid including: an aqueous base fluid; at least one viscoelastic surfactant; a divalent salt; a metal salt; and a metal oxide. In certain embodiments, the present disclosure provides methods including: introducing a treatment fluid comprising an aqueous base fluid, at least one viscoelastic surfactant, a divalent salt, a metal salt; and a metal oxide into a wellbore penetrating at least a portion of a subterranean formation; and allowing the treatment fluid to at least partially set, wherein the treatment fluid exhibits a right angle set to at least partially plug a loss zone.

Among the numerous advantages of the present disclosure, the compositions and methods of the present disclosure may allow a cement composition that includes a metal oxide (e.g., a Sorel cement) to be more easily pumped downhole as compared to certain other cement compositions. In some embodiments, the inclusion of a sulfate salt may improve the reactivity of the cement compositions and/or provide a lower-cost alternative to other salts. The methods and compositions of the present disclosure may be used as a lost circulation material that could be used on any formation, or in any drilling fluid. In certain embodiments, the treatment fluid is suitable for mitigating or preventing severe to total lost circulation, even when particulate solutions have failed. In certain embodiments, the treatment fluids of the present disclosure may allow curing of losses in extra-large fractured formations by providing a non-damaging cement composition as compared to certain other cement compositions. For example, in certain embodiments, the treatment fluids of the present disclosure may provide an enhanced ability to plug a loss zone by allowing a substantially polymer-free and/or substantially clay-free introduction of a cement composition. Thus, in some embodiments, the treatment fluids of the present disclosure may be substantially polymer-free and/or substantially clay-free. In certain embodiments, this may at least in part avoid the problems associated with polymer-based and clay-based treatment fluids (e.g. undesirable residue in the subterranean formation after use). In certain embodiments, the treatment fluids of the present disclosure may provide an enhanced ability to plug a loss zone by providing a cement composition that at least partially degrades or dissolves in response to contact with an acidic fluid. In certain embodiments, this may simplify removal of the cement composition during completion operations.

Treatment fluids typically contain additives to impart desired physical and/or chemical characteristics to the fluid. Cement compositions may prevent or lessen the loss of circulation fluids from a wellbore. The cement compositions of the present disclosure may be used in a variety of applications and environments in which plugging a loss zone may be important. Examples of applications suitable for certain embodiments of the present disclosure may include, but are not limited to use in subterranean formations, and/or downhole applications (e.g., drilling, fracturing, completions, oil production). In certain embodiments, cement compositions may be applicable to injection wells, monitoring wells, and/or production wells, including hydrocarbon or geothermal wells and wellbores. In other embodiments, the cement compositions may be introduced into a subterranean formation, for example, via a wellbore penetrating at least a portion of a subterranean formation. Addressing fluid loss that occurs during drilling or other downhole operations may be important for achieving the service of the fluid and/or mitigating or preventing severe to total lost circulation.

In certain embodiments, a first treatment fluid including an aqueous base fluid, at least one viscoelastic surfactant, a divalent salt, a metal salt and a metal oxide may be provided. Depending on the type of treatment to be performed, the treatment fluid may include any treatment fluid known in the art. Treatment fluids that may be useful in accordance with the present disclosure include, but are not limited to, drilling fluids, cement fluids, lost circulation fluids, stimulation fluids (e.g., a fracturing fluids or an acid stimulation fluids), completion fluids, conformance fluids (e.g., water or gas shutoff fluids), sand control fluids (e.g., formation or proppant consolidating fluids), workover fluids, and/or any combination thereof.

In certain embodiments, a treatment fluid including an aqueous base fluid, at least one viscoelastic surfactant, a divalent salt, a metal salt and a metal oxide may be introduced into a location (e.g. into at least a portion of a subterranean formation). In certain embodiments, the treatment fluid including the aqueous base fluid, at least one viscoelastic surfactant, the divalent salt, the metal salt and the metal oxide may at least partially plug a loss zone at elevated temperatures, e.g. a temperature corresponding to a temperature in a loss zone. In certain embodiments, the treatment fluid including the aqueous base fluid, at least one viscoelastic surfactant, the divalent salt, the metal salt and the metal oxide may be pumped downhole and squeezed. In other embodiments, the treatment fluid including the aqueous base fluid, at least one viscoelastic surfactant, the divalent salt, the metal salt and the metal oxide may be simply pumped into the subterranean formation. In certain embodiments, the treatment fluid may form a cement mixture to entirely fill the loss zone. In certain embodiments, the treatment fluid may be applied as a substantially full concentration spacer or pill. For example, with reference to FIG. 1, subterranean formation 10 may include drill bit 11. In certain embodiments, drill bit 11 may break into loss zone 12. In certain embodiments, the treatment fluids of the present disclosure 13 may be pumped into loss zone 12 to at least partially plug the loss zone.

The treatment fluids used in the methods of the present disclosure may include any aqueous base fluid known in the art. The term "base fluid" refers to the major component of the fluid (as opposed to components dissolved and/or suspended therein), and does not indicate any particular condition or property of that fluids such as its mass, amount, pH, etc. Aqueous base fluids that may be suitable for use in the methods and systems of the present disclosure may include water from any source. Such aqueous fluids may include fresh water, field water, salt water (e.g., water containing one or more salts dissolved therein), brine (e.g., saturated salt water), seawater, or any combination thereof. In most embodiments of the present disclosure, the aqueous fluids include one or more ionic species, such as those formed by salts dissolved in water. In some embodiments, the aqueous base fluid may include BRINE-DRIL-N® (a high density, polymeric, brine-based system, available from Halliburton Energy Services, Inc.) or HYDRO-GUARD both available from Halliburton Energy Services, Inc. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate.

Surfactants are compounds that lower the surface tension of a liquid, the interfacial tension between two liquids, or that between a liquid and a solid. Surfactants may act as detergents, wetting agents, emulsifiers, foaming agents, and dispersants. Surfactants are usually organic compounds that are amphiphilic, meaning they contain both hydrophobic groups ("tails") and hydrophilic groups ("heads"). Therefore, a surfactant contains both a water-insoluble (or oil soluble) portion and a water-soluble portion.

In a water phase, surfactants form aggregates, such as micelles, where the hydrophobic tails form the core of the aggregate and the hydrophilic heads are in contact with the surrounding liquid. The aggregates can be formed in various shapes such as spherical or cylindrical micelles or bilayers. The shape of the aggregates depends on the chemical structure of the surfactants, depending on the balance of the sizes of the hydrophobic tail and hydrophilic head. As used herein, the term "micelle" includes any structure that minimizes the contact between the lyophobic ("solvent-repelling") portion of a surfactant molecule and the solvent, for example, by aggregating the surfactant molecules into structures such as spheres, cylinders, or sheets, wherein the lyophobic portions are on the interior of the aggregate structure and the lyophilic ("solvent-attracting") portions are on the exterior of the structure.

Certain types of surfactants may impart viscosity and/or elasticity to a fluid. Such a surfactant is referred to as a "viscoelastic surfactant" ("VES"). When used as a viscosity-increasing agent, the molecules (or ions) of the surfactant associate to form micelles of a certain micellar structure (e.g., rod-like, worm-like, vesicles, etc., which are referred to herein as "viscosifying micelles") that, under certain conditions (e.g., concentration, ionic strength of the fluid, etc.) may be capable of, inter alia, imparting increased viscosity to a particular fluid or forming a gel. Certain viscosifying micelles may impart increased viscosity to a fluid such that the fluid exhibits viscoelastic properties (e.g., shear thinning properties) due, at least in part, to the association of the surfactant molecules contained therein.

Viscoelastic surfactants may be particularly suitable for certain applications due to, inter alia, their less-damaging nature towards a subterranean formation as compared to crosslinked polymer fluids. Viscoelastic surfactants develop viscosity by aggregation of surfactant molecules that demonstrate similar properties to polymers. The viscoelastic surfactant may break down easily on dilution or contact with oil, thereby leaving negligible residue in the reservoir.

The viscoelastic surfactants used in accordance with the methods and compositions of the present disclosure may include any suitable viscoelastic surfactant that is capable of imparting viscoelastic properties to an aqueous fluid. The viscosity of a fluid that includes one or more viscoelastic surfactants may depend on various factors such as the structure of the surfactant, nature of the counter ion, temperature, and presence of water-insoluble components. The viscoelastic surfactant may be cationic, anionic, or amphoteric in nature, and include any number of different compounds, including ester sulfonates, methyl ester sulfonates, hydrolyzed keratin, sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, sulfobetaines, alkylamidobetaines (e.g., cocoamidopropyl betaine), quaternary ammonium compounds (e.g., trimethyltallowammonium chloride, trimethylcocoammonium chloride), derivatives thereof, and combinations thereof. The term "derivative" is defined herein any compound that is made from one of the listed compounds, for example, by replacing one atom in one of the listed compounds with another atom or group of atoms, ionizing one of the listed compounds, or creating a salt of one of the listed compounds. The viscoelastic surfactant may include, but is not limited to, ACAR-13019 and/or ACAR-21008 (available from Nouryon), and any combination thereof.

The viscoelastic surfactant should be present in an amount sufficient to provide the desired viscosity to a treatment fluid (e.g., sufficient viscosity to divert flow, reduce fluid loss, suspend particulates, etc.) therein through formation of viscosifying micelles.

In certain embodiments, the viscoelastic surfactant may be present in a treatment fluid in an amount in the range from about 0.1% to about 20% by weight of the treatment fluid. In certain embodiments, the viscoelastic surfactant may be present in a treatment fluid in an amount in the range from about 0.5% to about 10% by weight of the treatment fluid. In certain embodiments, the viscoelastic surfactant may be present in a treatment fluid in an amount in the range from about 2% to about 10% by weight of the treatment fluid. In certain embodiments, the viscoelastic surfactant may be present in a treatment fluid in an amount in the range from about 1% to about 3% by weight of the treatment fluid.

The divalent salt used in accordance with certain embodiments of the methods and compositions of the present disclosure may be any water-soluble divalent salt. Suitable divalent salts may include magnesium, calcium, or zinc cations, and chloride, bromide, iodide, formate, nitrate, acetate, cyanate, or thiocyanate anions. Examples of divalent salts that may be suitable that include the above-listed anions and cations include, but are not limited to calcium bromide, calcium chloride, calcium nitrate, calcium formate, magnesium chloride, magnesium bromide, zinc chloride, and zinc bromide. In certain embodiments, the divalent salt may be present in the treatment fluid of the present invention in an amount in the range of from about 1% to about 50% by weight of the treatment fluid. In certain other embodiments, the divalent salt may be present in the treatment fluids of the present invention in an amount in the range of from about 1% to about 5% by weight of the treatment fluid.

In certain embodiments, the metal salt and/or the metal oxide may be components of a Sorel cement, otherwise known as magnesium oxychloride cement. Sorel cement may include a metal oxide and a metal salt. In certain embodiments, the metal oxide may include, but is not limited to magnesium oxide, zinc oxide, and the like, and any combination thereof. In certain embodiments, the metal salt may include, but is not limited to a chloride salt, a sulfate salt, a phosphate salt, and the like, or any combination thereof. In certain embodiments, the treatment fluids and/or the resulting cement mixture may have a weight ratio within a range of from about 2.5 to about 3.5 parts metal oxide to 1 part metal salt, from about 2 to about 5 parts metal oxide to 1 part metal salt, or from about 1 to about 10 parts metal oxide to 1 part metal salt. In certain embodiments, the treatment fluids and/or the resulting cement mixture may have a weight ratio of about 1 part metal oxide to 1 part metal salt. Sorel cements may be used for any purpose, including but not limited to controlling water injection into zones that are not the targets of the injection prevention and lost circulation mitigation.

In an embodiment, one or more treatment fluids may include a metal salt. Metal salts suitable for certain embodiments of the present disclosure include, but are not limited to a chloride salt, a phosphate salt, a sulfate salt, or any combination thereof. In some embodiments, the treatment fluid includes an alkaline earth metal chloride such as magnesium chloride ($MgCl_2$) or magnesium chloride hexahydrate, $MgCl_2.6H_2O$. In certain embodiments, for example, the sulfate salt may include $MgSO_4$. In certain embodiments, the sulfate salt may include, but is not limited to $MgSO_4$, $MgSO_4.2H_2O$, $MgSO_4.4H_2O$, $MgSO_4.5H_2O$, $MgSO_4.6H_2O$, $MgSO_4.7H_2O$, $MgSO_4.11H_2O$, and the like, or any combination thereof. In certain embodiments, after setting, a cement mixture including a sulfate salt may exhibit a compressive strength 70% higher than an identical cement mixture including a chloride salt instead of the sulfate salt. In some embodiments, after setting, a cement mixture including a sulfate salt may sustain differential pressures 200%, 300%, 400%, 500%, 600%, 700%, 800%, 900%, 1000% greater than the identical cement mixture having a chloride salt instead of the sulfate salt.

In one or more embodiments, the metal salt may be present in a treatment fluid in an amount within a range of from about 0.1% to about 40% by weight of the treatment fluid (e.g., about 1%, about 5%, about 10%, about 15%, about 20%, about 25%, about 30%, about 35%, about 40% etc. all by weight of the treatment fluid). In other embodiments, the metal salt may be present in a treatment fluid in an amount within a range of from about 1% to about 40% by weight of the treatment fluid. In some embodiments, the metal salt may be present in the treatment fluid in an amount within a range of from about 10% to about 40% by weight of the treatment fluid. In some embodiments, the metal salt may be present in a concentration of about 20% to about 35% by weight of the treatment fluid.

In certain embodiments, the metal salt used in accordance with the methods and compositions of the present disclosure is magnesium sulfate heptahydrate ($MgSO_4$ $7H_2O$). In certain embodiments, the magnesium sulfate heptahydrate may be present in the treatment fluid of the present invention in an amount in the range from about 20% to about 35% by weight of the treatment fluid.

In certain embodiments, a treatment fluid may include a metal oxide. In certain embodiments, the metal oxide is magnesium oxide (MgO). Such MgO may be produced, for example, via calcination of $Mg(OH)_2$. The calcination of $Mg(OH)_2$ results in what is commonly referred to as "burned" MgO. Three basic grades of burned MgO are typically produced with the differences between each grade related to the degree of reactivity remaining after being exposed to a range of high temperatures. The original magnesium hydroxide particle is usually a large and loosely bonded particle. Exposure to thermal degradation by calcination may cause the $Mg(OH)_2$ to alter its structure so that the surface pores are slowly filled in while the particle edges become more rounded. This results in MgO with varying degrees of crystallinity and consequently varying degrees of reactivity. When the MgO is produced by calcining to temperatures ranging between 1500° C.-2000° C. the MgO is referred to as "dead-burned" since the majority of the reactivity has been eliminated. Dead-burned MgO has the highest degree of crystallinity of the three grades of burned MgO. A second type of MgO is produced by calcining at temperatures ranging from 1000° C.-1500° C. and is termed "hard-burned." Hard-burned MgO displays an intermediate crystallinity and reactivity when compared to the other two grades of burned MgO. Examples of hard-burned MgO include, without limitation, THERMATEK™ LT and THERMATEK™ HT additives, which are commercially available from Halliburton Energy Services. The third grade of MgO is produced by calcining at temperatures ranging from 700° C.-1000° C. and is termed "light-burned" or "caustic" magnesia. Light-burned MgO is characterized by a high surface area, a low crystallinity and a high degree of reactivity when compared to the other grades of burned MgO. In certain embodiments, the treatment fluid may include, but is not limited to hard-burned MgO, light-burned MgO, dead-burned MgO, or any combination thereof.

In some embodiments, certain properties of magnesium oxide may affect its reactivity (e.g., the extent and rate of hydration to $Mg(OH)_2$ when exposed to water, acids, or other reactive materials). For example, kiln temperature and residence time during manufacture may affect magnesium oxide reactivity. Consequently, magnesium oxide reactivity may vary. In some embodiments, magnesium oxide reactivity may be measured using an acetic acid or citric acid reactivity test. A reactivity test may include reacting a dilute (about 1N) acetic or citric acid solution with an excess of magnesium at a particular temperature and measuring how long it takes until the reaction is complete. In some embodiments, the end point of the reaction may be indicated by the pH of the solution changing from acidic to basic. In some embodiments, the magnesium oxide used in the treatment fluid may be sufficiently reactive such that an excess of magnesium oxide may fully react with acetic acid in under 40 seconds at around 28° C. (82° F.). In certain embodiments, the magnesium oxide is capable of reacting substantially completely with a 1N solution of aqueous acetic acid in less than 40 seconds at around 28° C. (82° F.). In certain embodiments, the magnesium oxide is capable of reacting substantially completely with a 1N solution of aqueous acetic acid in less than 15 seconds at around 28° C. (82° F.).

In one or more embodiments, the metal oxide may be present in a treatment fluid in an amount within a range of from about 0.1% to about 40% by weight of the treatment fluid (e.g., about 1%, about 5%, about 10%, about 15%, about 20%, about 25%, about 30%, about 35%, about 40% etc., all by weight of the treatment fluid). In other embodiments, the metal oxide may be present in a treatment fluid in an amount within a range of from about 1% to about 40% by weight of the treatment fluid. In one or more embodiments, the metal oxide may be present in the treatment fluid in an amount within a range of from about 10% to about 40% by weight of the treatment fluid. In some embodiments, the metal oxide may be present in a concentration of about 20% to about 35% by weight of the treatment fluid.

Without limiting the disclosure to any particular theory or mechanism, it is believed that the viscoelastic surfactant may serve as a non-damaging carrier fluid. In certain embodiments, the viscoelastic surfactant may provide suspension properties for the particulates in a treatment fluid and allow them to be delivered in certain proportions to, for example, a loss zone.

Generally, the cement composition should remain in a pumpable state until the cement composition has been placed into the desired location. To retard the set time of the cement composition, a conventional set retarder composition may be included in a treatment fluid. The conventional set retarder composition that may be included in the cement compositions of the present invention may include any conventional set retarder composition suitable for use in subterranean operations. Examples of conventional set retarder compositions that may be suitable include lignosulfates ("LS"), hydroxycarboxy acids, phosphonic acid derivatives, borate salts, synthetic polymers, and combinations thereof. Examples of suitable hydroxycarboxy acids include tartaric acid, gluconic acid, citric acid, gluconoheptanoic acid, combinations thereof, and the like. An example of a suitable hydroxycarboxy acid is commercially available as "HR®-25" retarder from Halliburton Energy Services, Inc. Suitable synthetic polymers include a wide variety of synthetic polymers that may be used to delay the set time of a cement composition in cementing operations, including copolymers including an AMPS monomer and at least one monomer chosen from acrylic acid, methacaylic acid, itaconic acid, or maleic acid. Examples of suitable synthetic polymers are commercially available as "SCR™-100" retarder from Halliburton Energy Services, Inc., and as "SCR™-500" retarder from Halliburton Energy Services, Inc. In some embodiments, the conventional set retarder composition includes borate salts. Examples of suitable borate salts include potassium pentaborate, sodium tetraborate, borax, combinations thereof, and the like. An example of a suitable borate salt is commercially available as "COMPONENT R™" additive from Halliburton Energy Services, Inc. An example of a conventional set retarder composition including a phosphonic acid derivative is commercially available as "Micro Matrix™" cement retarder from Halliburton Energy Services, Inc. In some embodiments, the conventional set retarder composition includes combinations of the above-listed compositions. An example of a suitable combination is a conventional set retarder composition that includes calcium LS and gluconic acid, an example of which is commercially available as "HR12™" retarder, from Halliburton Energy Services, Inc., in a 75:25 calcium LS to gluconic acid weight ratio. One of ordinary skill in the art will be able to determine other suitable conventional set retarder compositions that may be used in the cement compositions of the present invention.

The amount of a particular conventional set retarder composition to include generally depends on a number of factors, including the bottomhole circulating temperature (BHCT) and bottom hole pressure of the well bore, the particular conventional set retarder composition chosen, the cement composition of the present invention containing the conventional set retarder composition, and other factors known to those of ordinary skill in the art. As those of ordinary skill in the art, with the benefit of this disclosure, will appreciate higher concentrations of the conventional set retarder composition may be needed with increasing BHCT. In some embodiments, the quantity of the conventional set retarder composition to be included in a cement composition of the present invention may be determined prior to preparation of the cement composition. For example, the quantity of a conventional set retarder composition to be included in a cement composition of the present invention may be determined by performing thickening time tests of the type described in API Recommended Practices 10B, Procedure 9, Twenty-Second Edition, December 1997. More particularly, in certain embodiments, a conventional set retarder composition is present in the cement compositions of the present invention in an amount in the range of from about 0.01% to about 10% by weight of cement (bwoc). In some embodiments, a conventional set retarder composition is present in the cement compositions of the present invention in an amount in the range of from about 0.1% to about 6% bwoc.

The cement compositions of the present invention may further include ethylenediaminetetraacetic acid (EDTA) and/or nitrilotriacetic acid (NTA). Among other things, EDTA and/or NTA may be included in the cement compositions of the present invention so the cement compositions may have desirable levels of set retardation, for example, in well bores having a BHCT of greater than about 450° F. (232° C.). Further, inclusion of EDTA and/or NTA may reduce the amount of a conventional set retarder composition that may be needed to achieve a desired level of set retardation, thereby possibly reducing the expense associated with the cementing operation, for example, where a synthetic polymer is included in the conventional set retarder composition.

Generally, the EDTA and/or NTA may be included in the cement compositions of the present invention in an amount sufficient to provide the desired level of set retardation in the cement compositions of the present invention, based on a number of factors including the amount and composition of the convention set retarder compositions, desired placement time, and the BHCT and bottom hole pressure of the well bore. As those of ordinary skill in the art, with the benefit of this disclosure, will appreciate higher concentrations of the conventional EDTA and/or NTA may be needed with increasing BHCT. In some embodiments, the quantity of the EDTA and/or NTA to be included in a cement composition of the present invention may be determined prior to preparation of the cement composition. For example, the quantity of a conventional set retarder composition to be included in a cement composition of the present invention may be determined by performing thickening time tests of the type described in API Recommended Practices 10B, Procedure 9, Twenty-Second Edition, December 1997. In some embodiments, the EDTA may be present in the cement compositions of the present invention in an amount in the range of from about 0.01% to about 10% bwoc. In some embodiments, the EDTA may be present in the cement compositions of the present invention in an amount in the range of from about 0.01% to about 6% bwoc. In some embodiments, the NTA may be present in the cement compositions of the present invention in an amount in the range of from about 0.01% to about 10% bwoc. In some embodiments, the NTA may be present in the cement compositions of the present invention in an amount in the range of from about 0.01% to about 6% bwoc. In some embodiments, where used in combination, the EDTA and the NTA may be present in the cement compositions of the present invention in an amount in the range of from about 0.01% to about 10% bwoc. In some embodiments, where used in combination, the EDTA and NTA may be present in the cement compositions of the present invention in an amount in the range of from about 0.01% to about 6% bwoc. Generally, where used in combination, the ratio of the EDTA to the NTA may vary based on a number of factors including, the desired set time, desired placement time, BHCT, and a variety of other factors known to those of ordinary skill in the art. In some embodiments, the ratio of the EDTA to the NTA may be in the range of from about 1:5 by weight to about 5:1 to weight. In some embodiments, the ratio of the EDTA to the NTA may be in the range of from about 1:2 by weight to about 2:1 to weight.

In some embodiments, spacer fluids between the treatment fluids may reduce or prevent the treatment fluids or components thereof from mixing with, reacting with, or contacting each other during introduction into the wellbore. In certain applications, components from treatment fluids separated by a spacer fluid may, to some degree, mix with a spacer fluid during pumping. In some embodiments, a mixing model may be generated to simulate a well system including a wellbore penetrating at least a portion of a subterranean formation, a first treatment fluid including a first base fluid and magnesium oxide, at least one spacer fluid, and a second treatment fluid including a second base fluid and a metal salt. In some embodiments, the mixing model may simulate a treatment operation including treatment fluids and spacer fluids in order to reduce and/or eliminate mixing. In certain embodiments, the mixing model may be used to calculate the minimum volume of spacer fluid necessary to prevent mixing between the treatment fluids. For example, the volume of the spacer fluid may be increased in the mixing model until there is no mixing of the first and second treatment fluids.

The spacer fluids of the present disclosure may include aqueous and/or non-aqueous fluids. A person of ordinary skill in the art with the benefit of this disclosure would understand how to determine the appropriate spacer fluids for various embodiments of present disclosure. In some embodiments, a drilling fluid may be used as a spacer fluid.

In certain embodiments, the mixing model may simulate the interface mixing length between the fluids based, at least in part, on at least one of the Reynolds numbers for each fluid and whether each fluid exhibits turbulent or laminar flow. A Reynolds number (Re) is a dimensionless value that may be described as follows:

$$\mathrm{Re} = \frac{\rho v D}{\mu} \quad (1)$$

where $\rho$ is density, $v$ is fluid velocity, D is pipe diameter, and $\mu$ is viscosity.

In some embodiments, fluid Reynolds numbers are an input to the mixing model. For example, in certain embodiments, a calculated Reynolds number is compared to a critical Reynolds number to determine whether turbulent or laminar flow is expected. A mixing model may be selected based, at least in part, on whether turbulent or laminar flow is expected for a certain application. In some embodiments, the constraints of the mixing model may include, but are not limited to wellbore pressure, pump pressure limits, pipe diameter, pipe length, temperature, pressure, and the like, and any combination thereof. In certain embodiments, the mixing model may be used to determine at least one or more properties of one or more treatment fluids or spacer fluids based, at least in part, on minimizing the mixing between the fluids. In certain embodiments, one or more properties may include, but are not limited at least one of a pump rate, a viscosity, a volume, a rheology, a density, or a composition of one or more treatment fluids or spacer fluids. The mixing model may be used to determine the one or more properties, for example, by simulating the fluid and interface behavior of the first treatment fluid, second treatment fluid, and spacer fluids. In one or more embodiments, the mixing model may be used to determine a temperature or pressure at which fluids are pumped. In some embodiments, the mixing model may be used to determine one or more fluid properties based, at least in part, on the Reynolds numbers for the fluids. In certain embodiments, the mixing model may be used to calculate one or more properties of the fluids that result in turbulent flow and/or the least amount of mixing. In certain embodiments, a treatment operation may be performed based, at least in part, on the one or more properties determined using the mixing model.

In some embodiments, an information handling system may be used generate, run, or otherwise operate on the mixing model and/or perform any calculations associated with the mixing model. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In certain embodiments, a treatment fluid may include a viscosifier in addition to the viscoelastic surfactant. Examples of additional viscosifiers suitable for certain embodiments of the present disclosure include, but are not limited to polysaccharides, celluloses, fibers, clays, additional polymers, and the like, and any combination thereof. Fibers suitable for certain embodiments of the present disclosure include, but are not limited to acid-soluble mineral fibers, such as the fiber commercially available from Halliburton Energy Services, Inc., of Houston, Texas under the trade name N-SEAL™.

In one or more embodiments, an additional viscosifier may be present in a treatment fluid in an amount within a range of from about 1% to about 60% by weight of the treatment fluid (e.g., about 5%, about 10%, about 15%, about 20%, about 25%, about 30%, about 35%, about 40%, about 45%, about 50%, or about 55%, all by weight of the treatment fluid). In one or more embodiments, the additional viscosifier may be present in a treatment fluid in an amount within a range of from about 1% to about 35% by weight of the treatment fluid. In other embodiments, the additional viscosifier may be present in the treatment fluid in an amount within a range of from about 1% to about 15% by weight of the treatment fluid. Alternatively, the amount of additional viscosifier may be expressed by weight of dry solids. For example, the additional viscosifier may be present in an amount within a range of from about 1% to about 99% by weight of dry solids (e.g., about 1%, about 5%, about 10%, about 20%, about 30%, about 40%, about 50%, about 60%, about 70%, about 80%, about 90%, or about 99%, all by weight of dry solids). In some embodiments, the additional viscosifier may be present in an amount within a range of from about 1% to about 20% and, alternatively, from about 1% to about 10% by weight of dry solids. In some embodiments, the treatment fluid includes an additional viscosifier in an amount equal to or less than the amount of viscosifier needed to create a fluid that reaches a consistency of 40 Bearden units (Bc) in 15 minutes after the cementing reaction begins.

In some embodiments, a "gunking reaction" may occur in one or more treatment fluids of the present disclosure, allowing some movement for placement before the Sorel cement reaction and setting occurs. In some embodiments, a gunking reaction may form as a byproduct a viscous semi-solid mass that, when formed downhole in the flow path of a fluid, may offer immediate and significant resistance to penetration by the fluid and thereby prevent its flow. In some embodiments, the viscosity of the treatment fluid after the gunking reaction may be within a range of from about 1,000,000 centipoise to about 20,000,000 centipoise (cP). In some embodiments, the gunking reaction may be facilitated by, inter alia, the presence of an additional viscosifier in addition to the viscoelastic surfactant.

In one or more embodiments, one or more treatment fluids may mix with each other or with other fluids in a wellbore or subterranean formation to form a cement mixture that at least partially sets. In some embodiments, the cement mixture may develop a compressive strength within a range of from about 50 psi to about 20,000 psi. In other embodiments, the cement mixture may develop a compressive strength within a range of from about 100 psi to about 10,000 psi. In yet other embodiments, the cement mixture may develop a compressive strength within a range of from about 200 psi to about 1,000 psi. In one or more embodiments, the compressive strength of the cement mixture may develop within a range of from about 15 minutes to about 24 hours after the reactive materials mix and the cementing reaction begins. In other embodiments, the compressive strength of the cement mixture may develop within a range of from about 20 minutes to about 10 hours after the reactive materials mix and the cementing reaction begins. In certain embodiments, the compressive strength of the cement mixture may develop within a range of from about 20 minutes to about 8 hours after the reactive materials mix and the cementing reaction begins. As will be understood by one of ordinary skill in the art, the compressive strength that develops may be directly proportional to the ratio of Sorel cement to aqueous fluid. Consequently, increasing the amount of Sorel cement present in the treatment fluid may result in an increased final compressive strength of the set composition.

In certain embodiments, the treatment fluids of this disclosure exhibit a relatively constant viscosity for a period of time after they are initially prepared and while they are being introduced into the wellbore, e.g., during the period when the treatment fluids are in motion. In certain embodiments, once mixed with the reactive materials, the cement mixture quickly sets and the viscosity of the treatment fluid increases from about 5 Bearden consistency units (Bc) to about 110 Bc or higher in about 60 minutes or less, about 50 minutes or less, about 40 minutes or less, about 30 minutes or less, about 20 minutes or less, about 10 minutes or less, or about 1 minute or less. In certain embodiments, such a sudden increase in viscosity may be desirable to prevent gas or water migration into the cement mixture, which may facilitate the quick formation of an impermeable mass from a gelled state after placement. This behavior including a relatively sudden increase in viscosity may be referred to as "right angle set" and such cement compositions may be called "right angle set cement compositions," which may refer to, for example, the sharp or near right angle increase shown in a plot of viscosity as a function of time.

In certain embodiments, additives or properties of the treatment fluid may impact one or more properties of a cement. For example, in some embodiments, a gas-generating additive or a set of gas-generating reactants may be included in the treatment fluids of the present disclosure. Such additives may increase the amount of gas in the fluid, reducing the density of the cement. The strength of the cement may be increased in certain embodiments by, for example, adding fibers to the fluid, and/or increasing the number of particles in the fluid.

In one or more embodiments, a treatment fluid (e.g., before the cement mixture is formed and/or set) may have a density within a range of from about 4 lbs/gallon (ppg) to about 25 ppg. In other embodiments, a treatment fluid may have a density within a range of from about 8 ppg to about 18 ppg. In yet other embodiments, a treatment fluid may have a density within a range of from about 10 ppg to about 14 ppg. Density reducing additives such as glass beads or foam and expanding additives such as gas, suspension aids, defoamers and the like may be included in a treatment fluid to generate a lightweight cement slurry. A person of skill in the art with the benefit of this disclosure would understand how to determine suitable amounts of such density-reducing additives and methods for their use.

In certain embodiments, reactive materials (e.g., a metal oxide and/or metal salt) and aqueous fluid may be included in the treatment fluid in a particular ratio. In certain embodiments, for example, the ratio of reactive material to aqueous fluid may be in a range of from about 20:80 to about 70:30 by weight, from about 10:90 to about 60:40 by weight, or from about 5:95 to about 50:50 by weight. In other embodiments, the reactive material may be included in the treatment fluid in at least an amount sufficient to provide a ratio of reactive material to aqueous fluid greater than about 20:80 by weight. In certain embodiments, the reactive material may be included in the treatment fluid in at least an amount sufficient to provide a ratio of reactive material to aqueous fluid greater than about 40:60 by weight. In some embodiments, the ratio may depend on the temperature of the wellbore. In certain embodiments, for example, a greater amount of the reactive materials may be required at higher temperature.

In some embodiments, the treatment fluids of the present disclosure may include a weighting agent. Examples of suitable weighting agents include, but are not limited to barite, hematite, calcium carbonate, magnesium carbonate, iron carbonate, zinc carbonate, manganese tetraoxide, ilmenite, NaCl, KCl, $CaCl_2$, formate salts, and the like, and any combination thereof. These weighting agents may be at least partially soluble or insoluble in the treatment fluid. In one or more embodiments, a weighting agent may be present in the treatment fluids in an amount within a range of from about 1% to about 60% by weight of the treatment fluid (e.g., about 5%, about 10%, about 15%, about 20%, about 25%, about 30%, about 35%, about 40%, about 45%, about 50%, about 55%, etc., all by weight of the treatment fluid). In other embodiments, the weighting agents may be present in the treatment fluids in an amount within a range of from about 1% to about 35% by weight of the treatment fluid. In some embodiments, the weighting agent may be present in the treatment fluids in an amount within a range of from about 1% to about 10% by weight of the treatment fluid. Alternatively, the amount of weighting agent may be expressed by weight of dry solids. For example, the weighting agent may be present in an amount within a range of from about 1% to about 99% by weight of dry solids (e.g., about 1%, about 5%, about 10%, about 20%, about 30%, about 40%, about 50%, about 60%, about 70%, about 80%, about 90%, about 99%, etc., all by weight of dry solids). In some embodiments, the weighting agent may be present in an amount within a range of from about 1% to about 20% and, alternatively, within a range of from about 1% to about 10% by weight of dry solids.

Certain components of the treatment fluid may be provided as a "dry mix" to be combined with the base fluid and/or other components prior to or during introducing the treatment fluid into the subterranean formation. In some embodiments, the additives to the treatment fluid (e.g., an additional viscosifier, salt, and other additives) fluid may be stored together in sealed totes or containers prior to use. In some embodiments, a metal oxide may be added to the treatment fluid on the fly as a dry additive. In certain embodiments, a reactive material formulation including the metal oxide and metal salt may be a dry mix added to a base fluid. In certain embodiments, a reactive material formulation may be suitable for base fluids in the amount of 9.5 ppg. In other embodiments, a reactive material formulation may be suitable for base fluids in the amount of 10 ppg.

Embodiments of the treatment fluids of the present disclosure may be prepared in accordance with any suitable technique. In some embodiments, the desired quantity of base fluid may be introduced into a mixer (e.g., a cement blender) followed by the dry mix. The dry mix may include the divalent salt, metal salt, metal oxide and additional solid additives, for example. Additional liquid additives (e.g., the viscoelastic surfactant), and/or a conventional set retarder composition, may be added to the base fluid as desired prior to, or after, combination with the dry blend. This mixture may be agitated for a sufficient period of time to form a slurry. It will be appreciated by those of ordinary skill in the art, with the benefit of this disclosure, other suitable techniques for preparing treatment fluids may be used in accordance with embodiments of the present invention.

In some embodiments, the treatment fluids of the present disclosure may include a fluid loss control additive. Examples of suitable fluid loss control additives include FILTER-CHEK™ fluid (i.e., carboxymethyl starch), N-DRIL™ HT PLUS fluid (i.e., a crosslinked corn starch), PAC™-L fluid (i.e., polyanionic cellulose), all of which are commercially available from Halliburton Energy Services, Inc., and combinations thereof.

In certain embodiments, the treatment fluids may include lime. In certain embodiments, the lime may be hydrated lime. In some embodiments, the lime may be present in an amount within a range of from about 0.01% to about 5% by weight of (bwo) a weighting agent in the fluid, from about 1% to about 10% bwo a weighting agent in the fluid, or from about 1 to about 3% bwo a weighting agent in the fluid. In certain embodiments, the lime may be present in an amount within a range of at least 0.7% bwo the weighting agent in the treatment fluid.

In certain embodiments, the treatment fluid does not include a bridging agent. In certain embodiments, the treatment fluid does not include a significant amount (e.g., no more than 0.5%, 0.4%, 0.3%, 0.2%, 0.1%, or 0.01%, all by weight of the treatment fluid) of a bridging agent. In some embodiments, the treatment fluid is free or substantially free of particulates other than the metal salt and the metal oxide. In certain embodiments, the treatment fluid does not contain dolomite.

In certain embodiments, the treatment fluids of the present disclosure may include lost circulation materials or bridging agents. In some embodiments, lost circulation materials may be included in the compositions as a secondary mechanism to cure the losses without altering the thixotropic behavior of the treatment fluid. In certain embodiments, lost circulation materials or bridging agents may include, but are not limited to, BaraBlend® lost circulation materials (engineered, composite solutions, available from Halliburton Energy Services, Inc.) including BaraBlend®-657, BaraBlend®-665, and BaraBlend®-680; STOPPIT® lost circulation material (engineered, composite solution, available from Halliburton Energy Services, Inc.); BaraLock®-666 lost circulation material (engineered, supplemental solution of reticulated foam material, available from Halliburton Energy Services, Inc.); BARACARB® particulates (ground marble, available from Halliburton Energy Services, Inc.) including BARACARB® 5, BARACARB® 25, BARACARB® 150, BARACARB® 600, BARACARB® 1200; N-SEAL™ lost circulation material (an acid soluble extrusion spun mineral fiber available from Halliburton Energy Services, Inc.); STEELSEAL® particulates (resilient graphitic carbon, available from Halliburton Energy Services, Inc.) including STEELSEAL® powder, STEELSEAL® 50, STEELSEAL® 150, STEELSEAL® 400 and STEELSEAL® 1000; WALL-NUT® particulates (ground walnut shells, available from Halliburton Energy Services, Inc.) including WALL-NUT® M, WALL-NUT® coarse, WALL-NUT® medium, and WALL-NUT® fine; BARAPLUG® (sized salt water, available from Halliburton Energy Services, Inc.) including BARAPLUG® 20, BARAPLUG® 50, and BARAPLUG® 3/300; BARAFLAKE® (calcium carbonate and polymers, available from Halliburton Energy Services, Inc.); BAROFIBRE® (a fibrous cellulose material available from Halliburton Energy Services, Inc.); and the like; and any combination thereof. In certain embodiments, the treatment fluid does not include a lost circulation material.

In some embodiments, the methods of the present disclose may include introducing at least a portion of the treatment fluids into a loss zone or other flowpath and causing or allowing the treatment fluid to at least partially set (e.g., gel, gunk, etc.). In some embodiments, the treatment fluids may be introduced into the wellbore to prevent the loss of aqueous or non-aqueous fluids into loss zones such as voids, vugular zones, perforations, and natural or induced fractures. In certain embodiments, the treatment fluids may form a non-flowing, intact mass inside the loss-circulation zone which plugs the zone and inhibits loss of subsequently pumped drilling fluid, which allows for further drilling. For example, in certain embodiments, the treatment fluid may function as a plug that is placed into an annulus of the wellbore and prepares the formation for placement of a second (e.g., cementitious) composition. In certain embodiments, the treatment fluid may be introduced into the wellbore to isolate the subterranean formation from a portion of the wellbore; to support a conduit in the wellbore; to plug a void or crack in the conduit; to plug a void or crack in a cement sheath disposed in an annulus of the wellbore; to plug an opening between the cement sheath and the conduit; to be used as a fluid in front of cement slurry in cementing operations; and/or to seal an annulus between the wellbore and an expandable pipe or pipe string; or combinations thereof. In some embodiments, one or more treatment fluids may at least partially plug a loss zone. In certain embodiments, a cement mixture of the present disclosure may set and at least partially plug a loss zone.

In certain embodiments, the treatment fluids of the present disclosure may be suitable for use at a variety of temperatures, pH levels, water salinities, and mineralogies of subterranean formations. In some embodiments, the materials that make up the treatment fluids may at least partially set and/or be stable at high temperatures. In certain embodiments, the materials that make up the treatment fluids may function at temperatures above 90° F. (32° C.) and above 260° F. (127° C.). Thus, in certain embodiments, the treatment fluids and methods of the present disclosure may provide effective loss zone treatment, plug formation, and other wellbore treatment, even when used in conditions at or above 260° F. (127° C.). Moreover, the properties of treatment fluids may be effective over a range of pH levels. For example, in certain embodiments, the treatment fluids may provide effective fluid displacement and loss zone treatment from a pH within a range of about 7 to about 12. Additionally, the treatment fluids of the present disclosure may be suitable for a variety of subterranean formations, including, but not limited to shale formations and carbonate formations.

In certain embodiments, the treatment fluids of the present disclosure optionally may include any number of additional additives. Examples of such additional additives include, but are not limited to, additional salts, additional surfactants, acids, proppant particulates, diverting agents, gas, nitrogen, carbon dioxide, surface modifying agents, tackifying agents, foamers, corrosion inhibitors, scale inhibitors, catalysts, clay control agents, biocides, friction reducers, antifoam agents, flocculants, $H_2S$ scavengers, $CO_2$ scavengers, oxygen scavengers, lubricants, breakers, relative permeability modifiers, resins, wetting agents, coating enhancement agents, filter cake removal agents, antifreeze agents (e.g., ethylene glycol), cross-linking agents, curing agents, gel time moderating agents, curing activators, and the like. In some embodiments, the treatment fluid may contain rheology (viscosity and gel strength) modifiers and stabilizers. A person skilled in the art, with the benefit of this disclosure, will recognize the types of additives that may be included in the fluids of the present disclosure for a particular application.

The methods and compositions of the present disclosure can be used in a variety of applications. These include downhole applications (e.g., drilling, fracturing, completions, oil production), use in conduits, containers, and/or other portions of refining applications, gas separation towers/applications, pipeline treatments, water disposal and/or treatments, and sewage disposal and/or treatments.

The treatment fluids disclosed herein may directly or indirectly affect one or more components or pieces of equipment associated with the preparation, delivery, recapture, recycling, reuse, and/or disposal of the disclosed treatment fluids. For example, the disclosed treatment fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary treatment fluids. The disclosed treatment fluids may also directly or indirectly affect any transport or delivery equipment used to convey the treatment fluids to a well site or downhole such as, for example, any transport vessels, conduits, pipelines, trucks, tubulars, and/or pipes used to compositionally move the treatment fluids from one location to another, any pumps, compressors, or motors (e.g., topside or downhole) used to drive the treatment fluids into motion, any valves or related joints used to regulate the pressure or flow rate of treatment fluids, and any sensors (i.e., pressure and temperature), gauges, and/or combinations thereof, and the like. The disclosed treatment fluids may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), wiper balls, wiper darts, pigs, logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Figure 2:
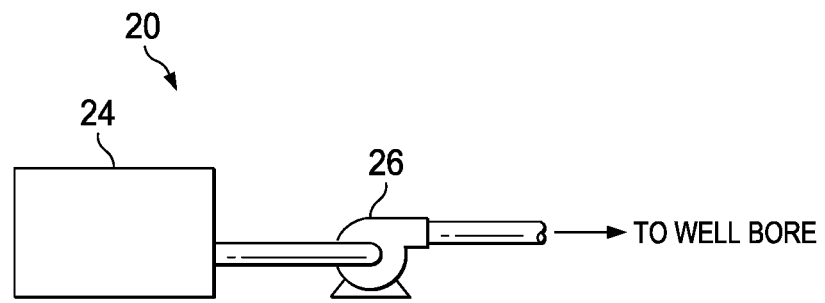
FIG. 2 illustrates a system for preparation and delivery of a cement composition to a wellbore in accordance with aspects of the present disclosure.

Referring now to FIG. 2, a system that may be used in the preparation of a treatment fluid in accordance with example embodiments will now be described. FIG. 2 illustrates a system 20 for preparation of a treatment fluid and delivery to a wellbore in accordance with certain embodiments. As shown, the treatment fluid may be mixed in mixing equipment 24, such as a jet mixer, re-circulating mixer, or a batch mixer, for example, and then pumped via pumping equipment 26 to the wellbore. In some embodiments, the mixing equipment 24 and the pumping equipment 26 may be disposed on one or more cement trucks as will be apparent to those of ordinary skill in the art. In some embodiments, a jet mixer may be used, for example, to continuously mix the composition, including water, as it is being pumped to the wellbore.

Figure 3:
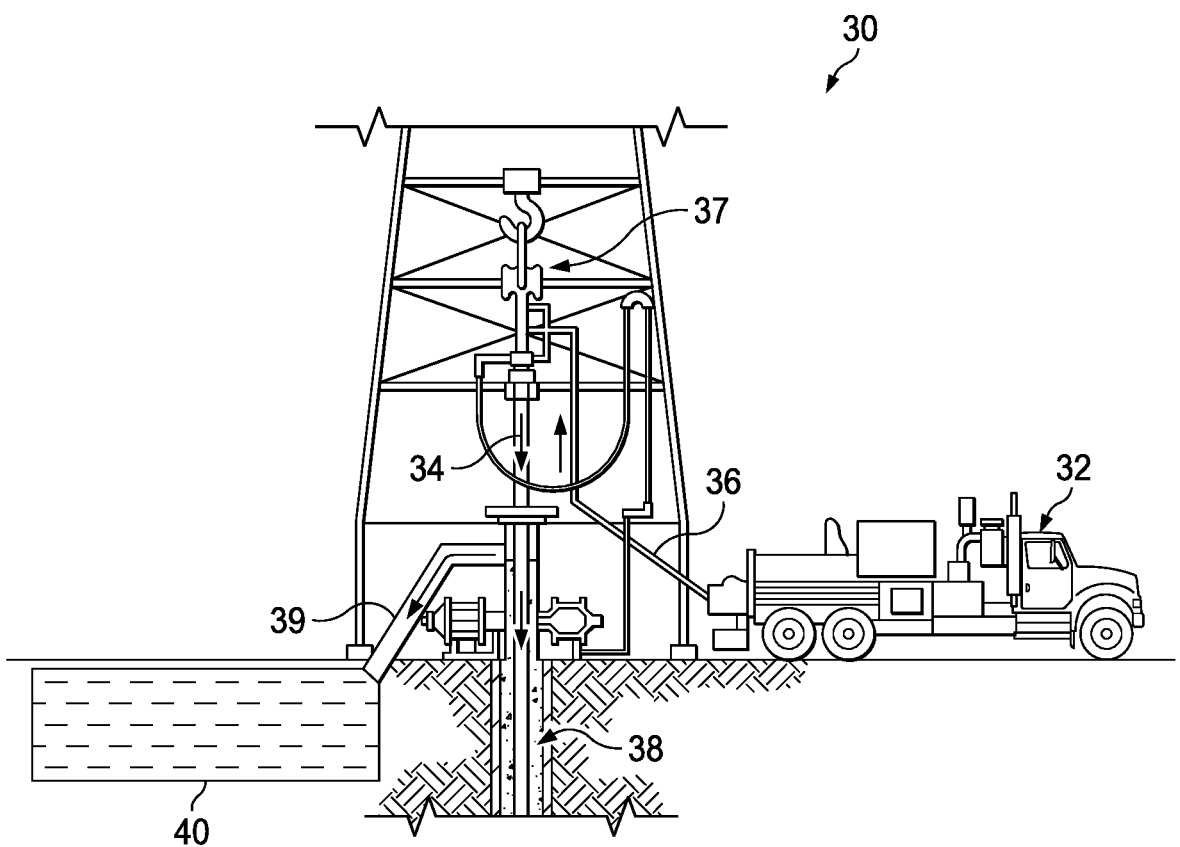
FIG. 3 illustrates surface equipment that may be used in placement of a cement composition in a wellbore in accordance with aspects of the present disclosure.

An example technique and system for placing a cement composition (e.g., a treatment fluid of the present disclosure) into a subterranean formation will now be described with reference to FIG. 3. FIG. 3 illustrates surface equipment 30 that may be used in placement of a cement composition in accordance with certain embodiments. It should be noted that while FIG. 3 generally depicts a land-based operation, those skilled in the art will readily recognize that the principles described herein are equally applicable to subsea operations that employ floating or sea-based platforms and rigs, without departing from the scope of the disclosure. As illustrated by FIG. 3, the surface equipment 30 may include a cementing unit 32, which may include one or more cement trucks. The cementing unit 32 may include mixing equipment 24 and pumping equipment 26 (e.g., FIG. 2) as will be apparent to those of ordinary skill in the art. The cementing unit 32 may pump a cement composition 34 through a feed pipe 36 and to a cementing head 37 which conveys the cement composition 34 downhole. As it is introduced, the cement composition 34 may displace other fluids 38, such as drilling fluids and/or spacer fluids. At least a portion of the displaced fluids 38 may exit the wellbore annulus via a flow line 39 and be deposited, for example, in one or more retention pits 40 (e.g., a mud pit), An embodiment of the present disclosure is a method including introducing a treatment fluid that includes an aqueous base fluid, at least one viscoelastic surfactant, a divalent salt, a metal salt, and a metal oxide into a wellbore penetrating at least a portion of a subterranean formation; and allowing the treatment fluid to at least partially set in the subterranean formation.

Another embodiment of the present disclosure is a treatment fluid including an aqueous base fluid, at least one viscoelastic surfactant, a divalent salt, a metal salt; and a metal oxide.

Another embodiment of the present disclosure is a method including introducing a treatment fluid that includes an aqueous base fluid, at least one viscoelastic surfactant, a divalent salt, a metal salt; and a metal oxide into a wellbore penetrating at least a portion of a subterranean formation; and allowing the treatment fluid to at least partially set, wherein the treatment fluid exhibits a right angle set to at least partially plug a loss zone.

Another embodiment of the present disclosure is a method including introducing a treatment fluid that includes an aqueous base fluid, at least one viscoelastic surfactant, a divalent salt, a metal salt, and a metal oxide into a wellbore penetrating at least a portion of a subterranean formation; and allowing the treatment fluid to at least partially set in the subterranean formation, wherein the aqueous base fluid is water. Optionally in this embodiment or any other embodiment disclosed herein, the divalent salt is $CaCl_2$. Optionally in this embodiment or any other embodiment of the present disclosure, the metal salt is selected from the group consisting of: $MgSO_4$, $MgSO_4.2H_2O$, $MgSO_4.4H_2O$, $MgSO_4.5H_2O$, $MgSO_4.6H_2O$, $MgSO_4.7H_2O$, $MgSO_4.11H_2O$, and any combination thereof. Optionally, in this embodiment or any other embodiment of the present disclosure, the metal salt is magnesium sulfate heptahydrate ($MgSO_4.7H_2O$). Optionally in this embodiment or any other embodiment of the present disclosure, the metal oxide is magnesium oxide (MgO). Optionally in this embodiment or any other embodiment of the present disclosure, the metal salt and metal oxide are each present in a concentration of about 20% to about 35% by weight of the treatment fluid. Optionally in this embodiment or any other embodiment of the present disclosure, the treatment fluid further includes a conventional set retarder composition. Optionally in this embodiment or any other embodiment of the present disclosure, the treatment fluid further includes a weighting agent.

Another embodiment of the present disclosure is a treatment fluid including an aqueous base fluid, at least one viscoelastic surfactant, a divalent salt, a metal salt; and a metal oxide, wherein the aqueous base fluid is water. Optionally in this embodiment or any other embodiment disclosed herein, the divalent salt is $CaCl_2$. Optionally in this embodiment or any other embodiment of the present disclosure, the metal salt is selected from the group consisting of: $MgSO_4$, $MgSO_4.2H_2O$, $MgSO_4.4H_2O$, $MgSO_4.5H_2O$, $MgSO_4.6H_2O$, $MgSO_4.7H_2O$, $MgSO_4.11H_2O$, and any combination thereof. Optionally in this embodiment or any other embodiment of the present disclosure, the metal salt is magnesium sulfate heptahydrate ($MgSO_4$ $7H_2O$). Optionally in this embodiment or any other embodiment of the present disclosure, the metal oxide is magnesium oxide (MgO). Optionally in this embodiment or any other embodiment of the present disclosure, the metal salt and metal oxide are each present in a concentration of about 20% to about 35% by weight of the treatment fluid. Optionally in this embodiment or any other embodiment of the present disclosure, the treatment fluid further includes a conventional set retarder composition. Optionally in this embodiment or any other embodiment of the present disclosure, the treatment fluid further includes a weighting agent.

Another embodiment of the present disclosure is a method including introducing a treatment fluid that includes an aqueous base fluid, at least one viscoelastic surfactant, a divalent salt, a metal salt; and a metal oxide into a wellbore penetrating at least a portion of a subterranean formation; and allowing the treatment fluid to at least partially set, wherein the treatment fluid exhibits a right angle set to at least partially plug a loss zone, wherein the at least partially set treatment fluid at least partially degrades in acidic fluid.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

The following examples demonstrate, inter alia, pumpability, right angle set, compressive strength and acid degradability for a cement composition according to some embodiments of the present disclosure. In each of the examples below, a treatment fluid for a flowable pill was prepared using the components shown in Table 1 as follows. $CaCl_2$ was added to water and mixed at a low shear rate. A viscoelastic surfactant (ACAR-13019 from Nouryon, a zwitterion that is a betaine or a sulfobetaine) was added and the mixture was sheared at low speed. Finally, a metal salt ($MgSO_4$ $7H_2O$) and a metal oxide (MgO) was mixed with the solution to produce a flowable pill.

TABLE 1

Treatment Fluid Formulation

| Component | Amount |
| --- | --- |
| Water (mL) | 187 |
| Viscoelastic surfactant | 11.2 |

TABLE 1-continued

Treatment Fluid Formulation

| Component | Amount |
|---|---|
| (ACAR-13019) (mL) | |
| $CaCl_2$ (g) | 9.37 |
| $MgSO_4 \cdot 7H_2O$ (g) | 168.2 |
| MgO (g) | 168.2 |

Example 1

In this example, the effectiveness of a chemical sealant treatment using the treatment fluids according to some embodiments of the present disclosure was tested. The treatment fluid shown in Table 1 was used in a chemical sealant treatment to plug a laboratory simulated 40 mm diameter fracture at a temperature of 260° F. The test results for plugging effectiveness of the formulation in Table 1 are shown in Table 2.

TABLE 2

Test results for a chemical sealant
treatment on a 40 mm simulated fracture

| Observation | Flowable and mixable |
|---|---|
| Plug | Solid and well shaped |
| Plug-breaking pressure | 1500 psi |

This Example demonstrates that a treatment fluid of the present disclosure can be used to effectively plug a large fractured formation in a chemical sealant treatment.

Example 2

Figure 4:
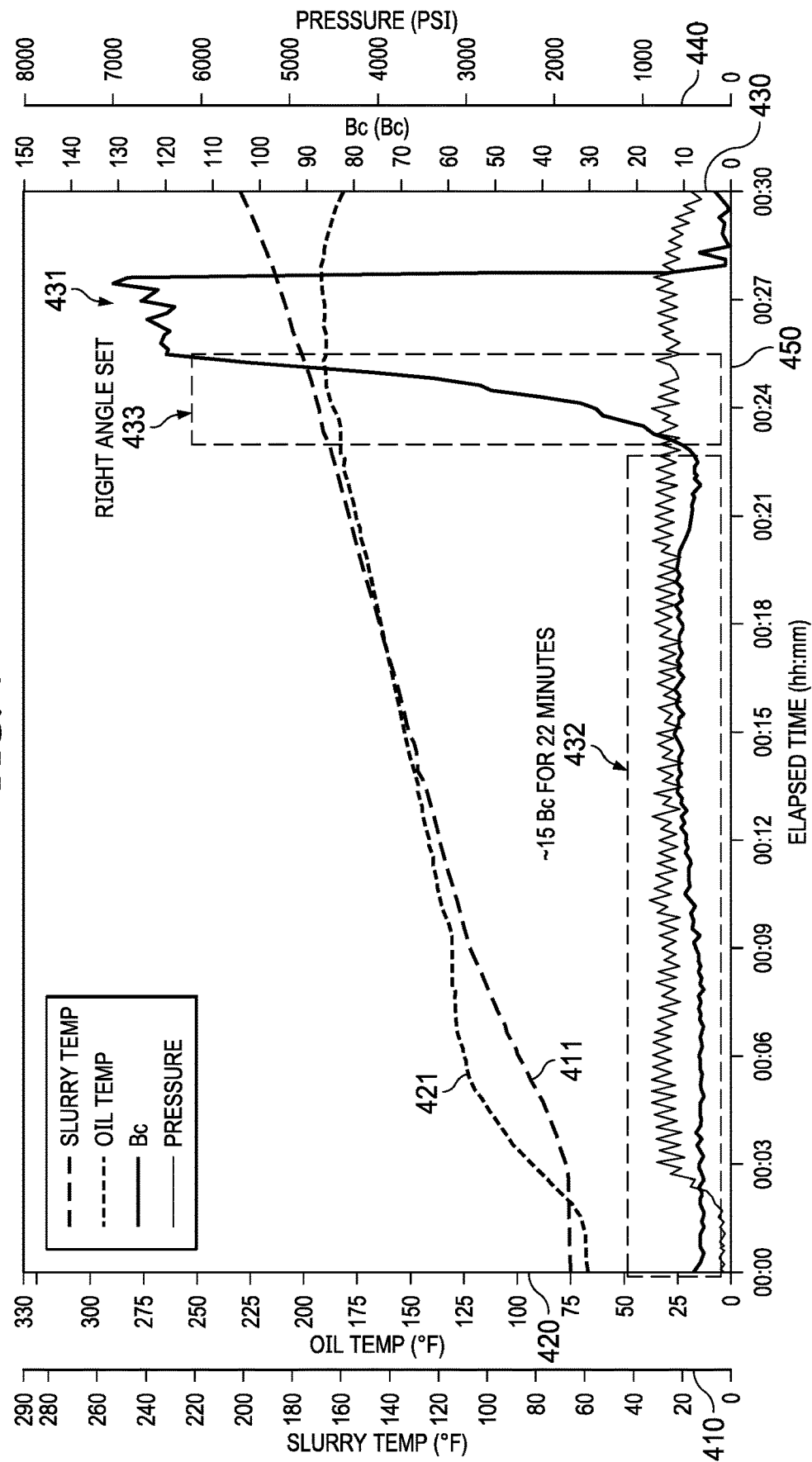
FIG. 4 is a plot of data relating to the pumpability and right angle set of an example of a treatment fluid of the present disclosure.

In this example, the pumpability and right-angle set of the formulation in Table 1 was tested in a pumpability test. The pumpability test was performed using a high temperature, high pressure (HTHP) consistometer in a laboratory. The results of this test are shown in FIG. 4. Referring now to FIG. 4, plot 400 shows the slurry temperature in ° F. on axis 410, the oil temperature in ° F. on axis 420, the consistency in Bearden consistency units (Bc) on axis 430, and the pressure in psi on axis 440, against elapsed time in minutes on axis 450. Plot 400 shows that, during the pumpability test, the temperature of the slurry 411 rose from about 65° F. (18° C.) to about 200° F. (93° C.) over about 30 minutes. The temperature of the oil 421 rose from about 70° F. (21° C.) to about 190° F. (88° C.) over the same time period. Plot 400 further shows that during the first 22 minutes of the test, the consistency 431 of the formulation in Table 1 remained at about 5-10 Bc (432). After about 22 minutes, the consistency 431 increased from about 10 Bc to about 110 Bc or higher in about 2-3 minutes, indicating a right angle set 433 of the formulation in Table 1. Therefore, FIG. 4 demonstrates that the formulation in Table 1 is expected to have favorable pumpability properties and have setting behavior consistent with a right angle set cement composition.

Example 3

Figure 5:
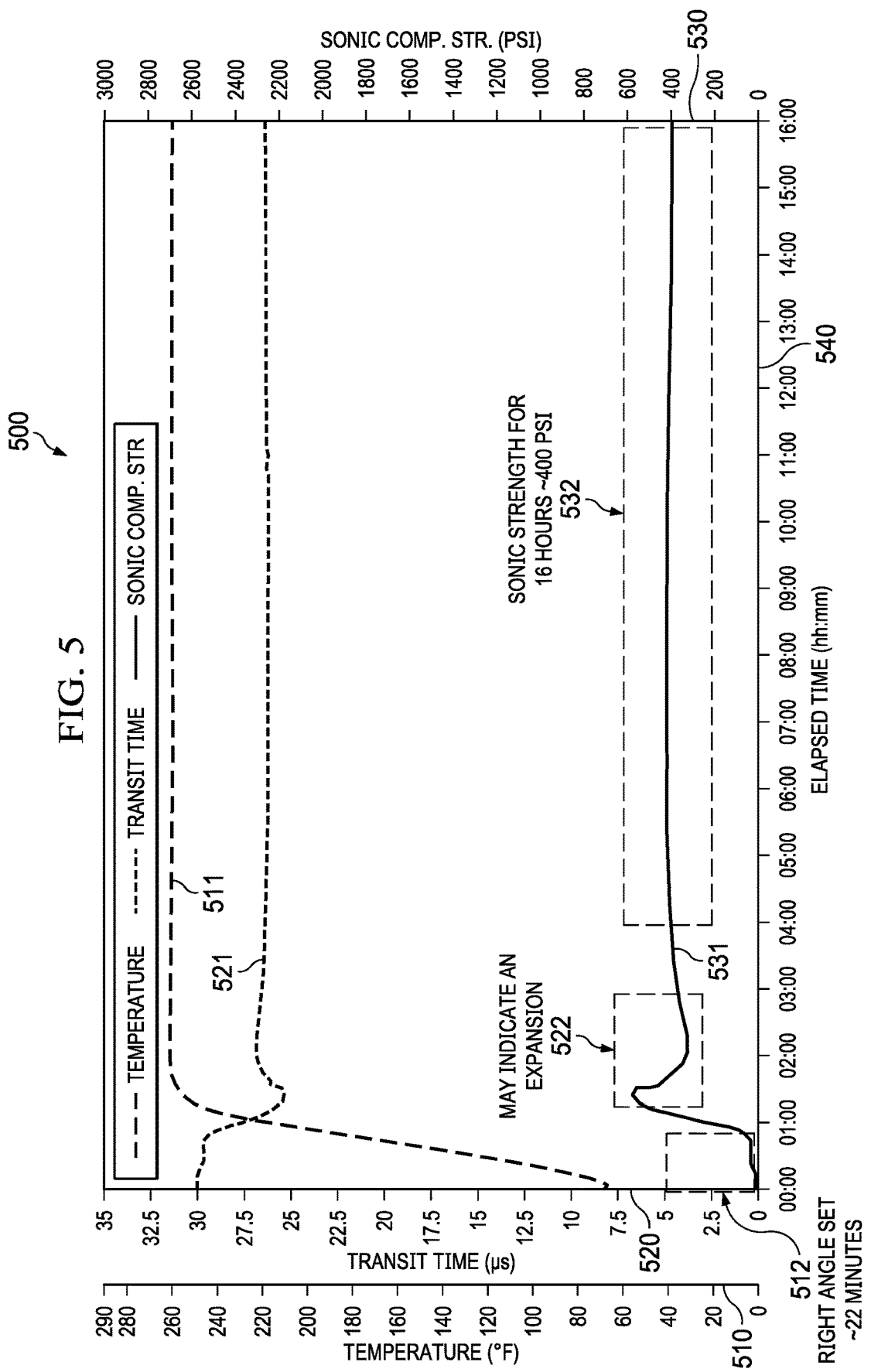
FIG. 5 is a plot of data relating to the strength of a set plug for a laboratory simulated fracture size of 40 mm formed after setting of a treatment fluid of the present disclosure.

In this example, a compressive strength test was performed on the treatment fluid formulation in Table 1. The compressive strength test was performed using an Ultrasonic Cement Analyzer (UCA). The results of this test are shown in FIG. 5. Referring now to FIG. 5, plot 500 shows the temperature in ° F. on axis 510, the transit time in us on axis 520, and the sonic compression strength in psi on axis 530, against elapsed time in hours on axis 540. Plot 500 shows that during the compressive strength test, as the temperature 511 increases, the treatment fluid undergoes a right angle set 512 after approximately 22 minutes, as indicated by a slight decrease (about 0.5 μs) in the transit time 521 and a slight increase (about 30 psi) in the sonic compressive strength 531. Plot 500 further shows that between an elapsed time of from about 1.1 to about 2.8 hours, an increase (about 2 μs) in the transit time 521 and a decrease (about 250 psi) in the sonic compressive strength 531 may indicate an expansion 522 of the treatment fluid. Plot 500 also shows that the sonic compressive strength 531 remains constant at about 400 psi from between about 4 hours until the end of the test at about 16 hours (532). FIG. 5 demonstrates that the formulation in Table 1 is expected to remain stable once set.

Example 4

Figure 6:
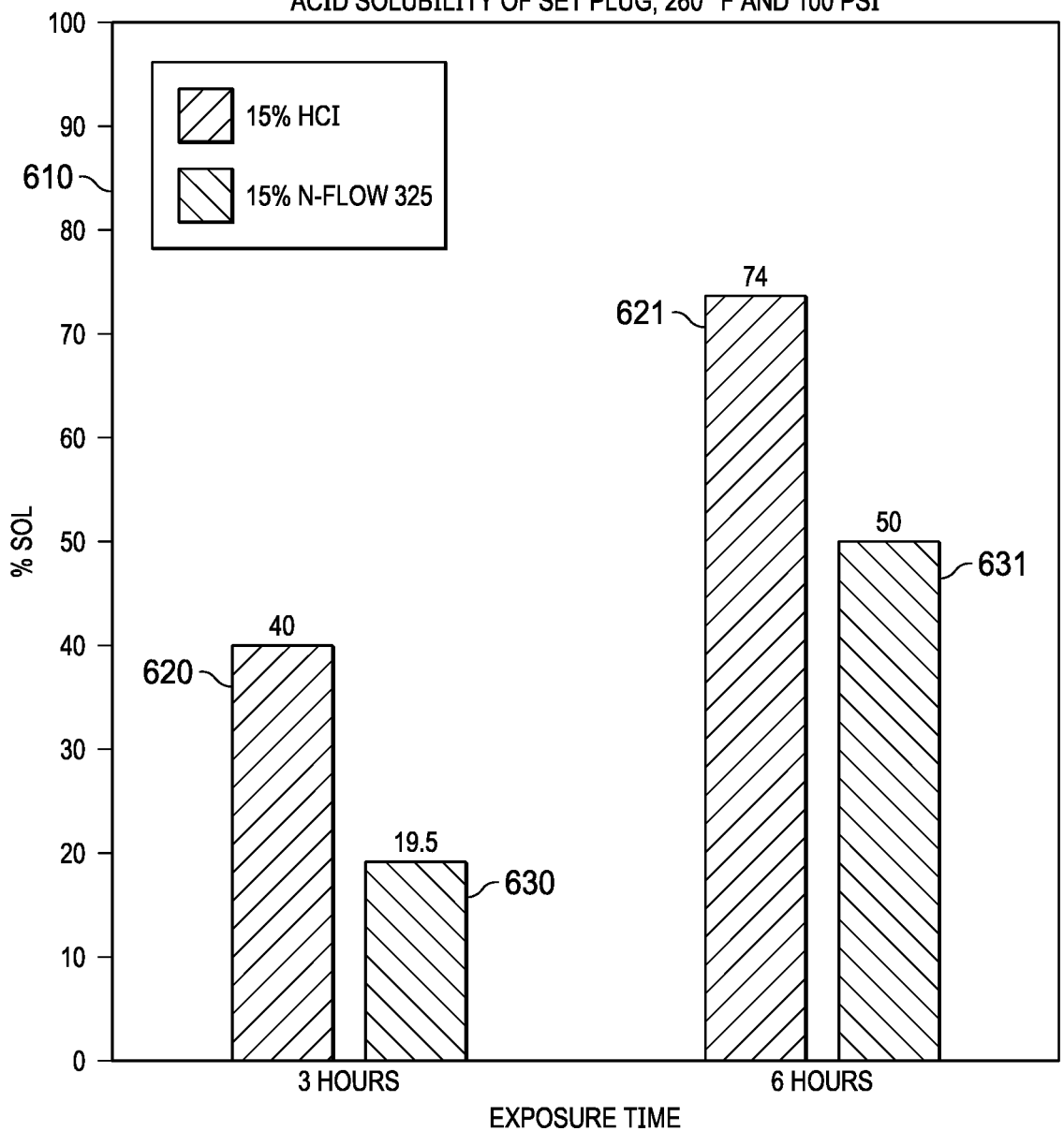
FIG. 6 is a plot of data relating to the acid degradability of a set plug for a laboratory simulated fracture formed after setting of a treatment fluid of the present disclosure.

In this example, the acid degradability of a set plug of the formulation in Table 1 was tested in an acid dissolution test. The results of this test are shown in FIG. 6. Referring now to FIG. 6, plot 600 shows the acid solubility in percent on axis 610 for a set plug of the formulation in Table 1 for 15% HCl (inorganic acid) and 15% N-Flow™ 325 (organic acid) after an exposure time 3 hours (620 and 630, respectively) and 6 hours (621 and 631, respectively) at 260° F. and 100 psi. Plot 600 shows that after 6 hours, the set plug is 74% dissolved in 15% HCl and 50% dissolved in 15% N-Flow 325. FIG. 6 demonstrates that a set plug of the formulation in Table 1 may be expected to at least partially degrade in an acidic fluid.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   introducing a treatment fluid comprising an aqueous base fluid, at least one viscoelastic surfactant, a divalent salt, magnesium sulfate heptahydrate ($MgSO_4 \cdot 7H_2O$), and magnesium oxide (MgO) into a wellbore penetrating at least a portion of a subterranean formation; and
   allowing the treatment fluid to at least partially set in the subterranean formation,
   wherein the magnesium sulfate heptahydrate is present in a concentration of about 20% to about 35% by weight of the treatment fluid and wherein the magnesium oxide is present in a concentration of about 20% to about 35% by weight of the treatment fluid.

2. The method of claim 1, wherein the aqueous base fluid is water.

3. The method of claim 1, wherein the divalent salt is $CaCl_2$).

4. The method of claim 1, wherein the treatment fluid further comprises a set retarder composition.

5. The method of claim 1, wherein the treatment fluid further comprises a weighting agent.

6. The method of claim 1, wherein the MgO comprises hard-burned MgO, dead burned MgO, or a combination thereof.

7. The method of claim 1, wherein introducing the treatment fluid into the wellbore further comprises combining a reactive material formulation comprising a dry blend of the magnesium oxide, the magnesium sulfate heptahydrate, and optionally the divalent salt with the aqueous base fluid.

8. The method of claim 1, wherein the divalent salt consists of one or more salts comprising magnesium, calcium, or zinc cations, and chloride, bromide, iodide, formate, nitrate, acetate, cyanate, or thiocyanate anions.

9. The method of claim 8, wherein the divalent salt consists of a salt selected from calcium bromide, calcium chloride, calcium nitrate, calcium formate, magnesium chloride, magnesium bromide, zinc chloride, zinc bromide, or combinations thereof.

10. The method of claim 8, wherein the treatment fluid comprises from about 1% to about 5% of the divalent salt by weight of the treatment fluid.

11. The method of claim 1, wherein the viscoelastic surfactant is selected from betaines, modified betaines, sulfobetaines, and combinations thereof.

12. The method of claim 11, wherein the treatment fluid comprises from about 1% to about 3% of the surfactant by weight of the treatment fluid.

13. A method comprising:
introducing a treatment fluid comprising an aqueous base fluid, at least one viscoelastic surfactant, a divalent salt, magnesium sulfate heptahydrate ($MgSO_4 \cdot 7H_2O$), and magnesium oxide (MgO) into a wellbore penetrating at least a portion of a subterranean formation; and
allowing the treatment fluid to at least partially set, wherein the treatment fluid exhibits a right angle set to at least partially plug a loss zone,
wherein the magnesium sulfate heptahydrate is present in a concentration of about 20% to about 35% by weight of the treatment fluid and wherein the magnesium oxide is present in a concentration of about 20% to about 35% by weight of the treatment fluid.

14. The method of claim 13, wherein the at least partially set treatment fluid at least partially degrades in acidic fluid.

15. A method comprising:
introducing a treatment fluid comprising an aqueous base fluid, at least one viscoelastic surfactant, a divalent salt, magnesium sulfate heptahydrate ($MgSO_4 \cdot 7H_2O$), and magnesium oxide (MgO) into a wellbore penetrating at least a portion of a subterranean formation; and
allowing the treatment fluid to at least partially set, wherein the treatment fluid exhibits a right angle set to at least partially plug a loss zone,
wherein the magnesium sulfate heptahydrate is present in a concentration of about 20% to about 35% by weight of the treatment fluid and wherein the magnesium oxide is present in a concentration of about 20% to about 35% by weight of the treatment fluid.

16. The method of claim 15, wherein the treatment fluid further comprises a set retarder composition.

17. The method of claim 15, wherein the treatment fluid further comprises a weighting agent.

* * * * *